Aug. 31, 1965     E. J. GAFFNEY     3,203,263
TWO-CYCLE INTERNAL COMBUSTION ENGINE
Filed May 28, 1962     4 Sheets-Sheet 1
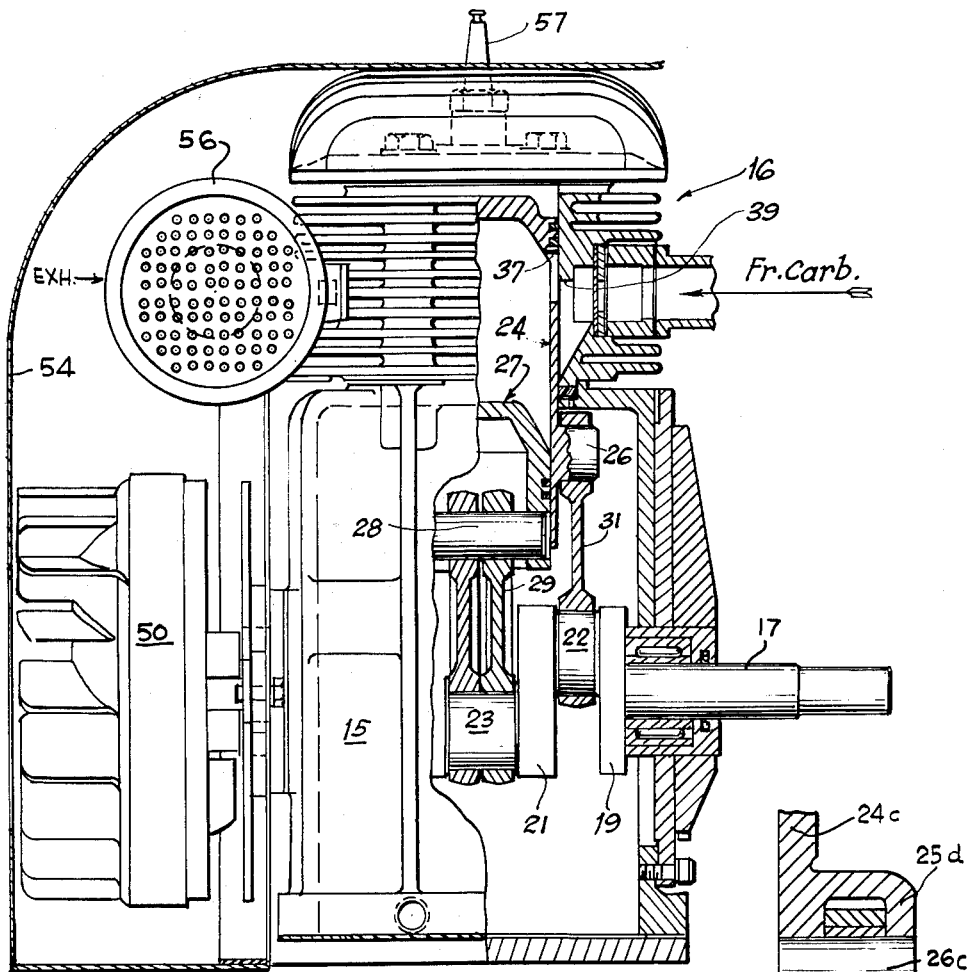
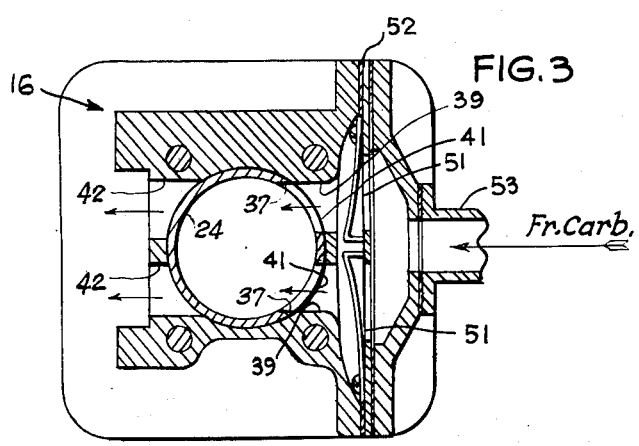
INVENTOR.
Edward J. Gaffney
BY Nathan N. Kraus
Frank H. Marks
Attorneys

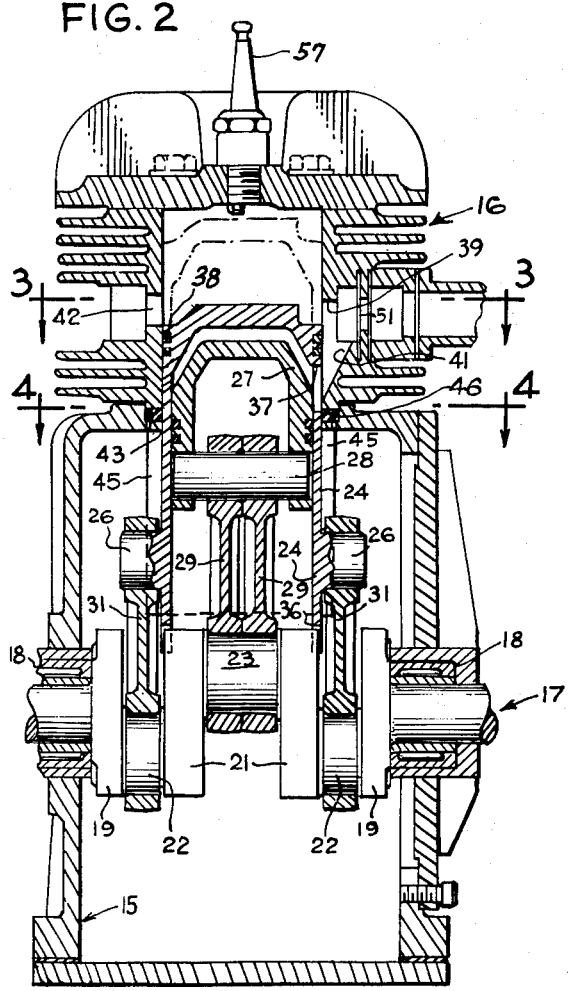
FIG. 2
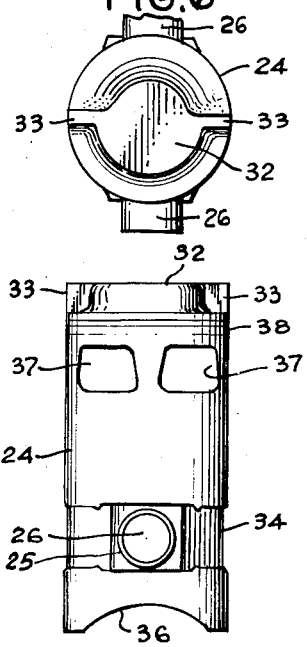
FIG. 6
FIG. 7
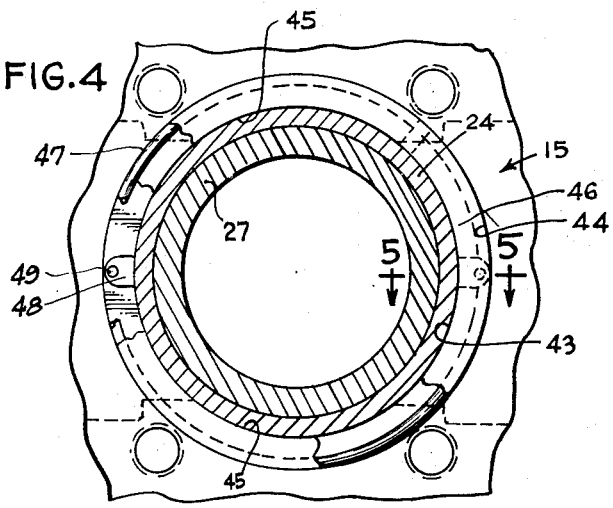
FIG. 4
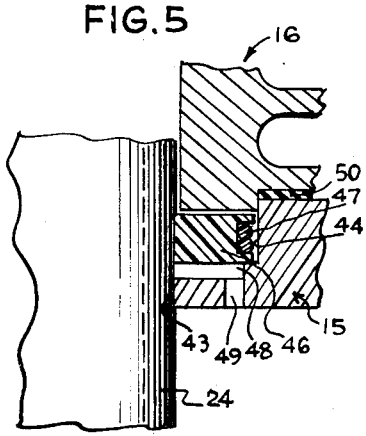
FIG. 5
INVENTOR.
Edward J. Gaffney
BY
Attorneys

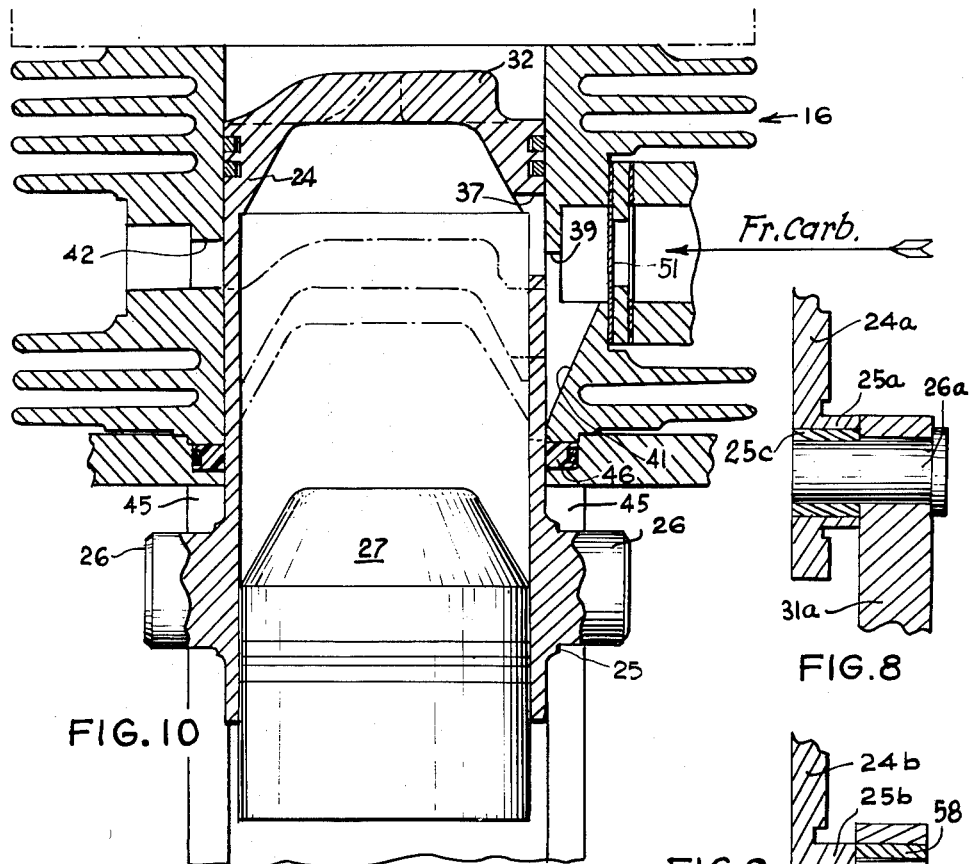
FIG. 10
FIG. 8
FIG. 9
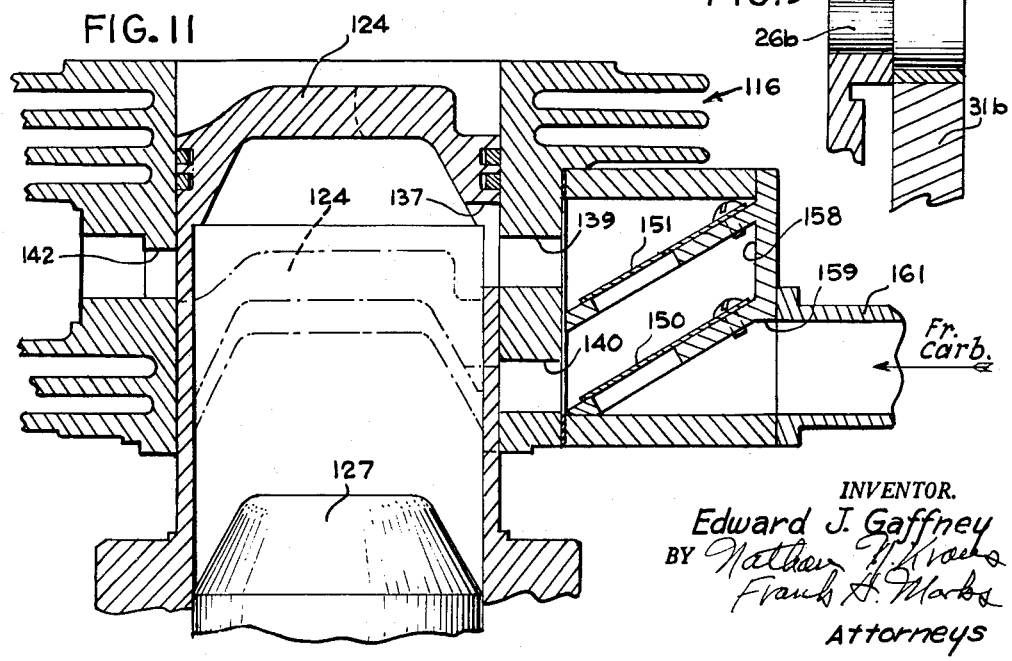
FIG. 11
INVENTOR.
Edward J. Gaffney
BY
Attorneys Aug. 31, 1965     E. J. GAFFNEY     3,203,263
TWO-CYCLE INTERNAL COMBUSTION ENGINE
Filed May 28, 1962     4 Sheets-Sheet 4

INVENTOR.
Edward J. Gaffney
BY
Attorneys

United States Patent Office 3,203,263
Patented Aug. 31, 1965

3,203,263
TWO-CYCLE INTERNAL COMBUSTION ENGINE
Edward J. Gaffney, 903 N. East Ave., Waukesha, Wis.
Filed May 28, 1962, Ser. No. 198,103
4 Claims. (Cl. 74—44)

This invention relates to improvements in two cycle internal combustion engines.

One of the objects of this invention is the provision of an improved engine of the foregoing type havings its parts so related and arranged whereby the combustible fuel mixture may be brought to a desired degree of preliminary compression or super-charging prior to entry into the combustion chamber.

Another object of this invention is the provision of an engine of the foregoing type having two pistons, one operating slidably within the other at 180° crankshaft angle from each other, so as to afford a perfect balancing of the reciprocating mass on the crankshaft.

Still another object of this invention is the provision of a two cycle engine affording oil bath lubrication for the parts thereby avoiding the requirement for mixing oil with the fuel, as in conventional two cycle engines.

A further object of this invention is the provision in an engine of the foregoing type of a power piston having external wrist pins.

A further object of this invention is the provision of a stationary oil ring cooperating with the power piston.

Still a further object of this invention is the provision of a stationary oil ring disposed in a groove in the crank case or cylinder cooperating with the power piston, there being drain openings in said groove arranged to conduct excess oil wiped by the ring over the external wrist pins for lubricating the same.

Another object of my invention is the provision of bearing shoes in axial alignment with the cylinder and extending into the crank case for guiding the piston in its movement within the crank case, thereby minimizing the requirement for providing guidance for the piston in the cylinder.

Another object of my invention is the provision in an engine of the foregoing type of separable bearing shoes for guiding the piston, thereby permitting the use of one kind of metal for casting the cylinder and crank case as a unit and the use of a dissimilar metal for producing the bearing shoes, the separable feature facilitating assembly of the engine parts.

Other and further objects and advantages of this invention will become apparent from the following description and the same is considered in connection with the accompanying drawings in which:

FIG. 1 is a front elevational view of a two cycle engine in accordance with my invention, with certain parts broken away to show details of construction.

FIG. 2 is a vertical cross-sectional view of my invention and showing the pistons in relationship 180° apart on the arms of the crank shaft.

FIG. 3 is a cross-sectional view taken substantially on line 3—3 of FIG. 2.

FIG. 4 is a cross-sectional view, on an enlarged scale, taken substantially on line 4—4 of FIG. 2.

FIG. 5 is a cross-sectional view, on an enlarged scale, taken substantially on line 5—5 of FIG. 4.

FIGS. 6 and 7 are respectively top and side elevational views of the power piston.

FIGS. 8 and 9 are fragmentary cross-sectional views of modified embodiments of the power piston construction.

FIG. 10 is a fragmentary vertical cross-sectional view, on an enlarged scale to more clearly show the relationship between the piston and cylinder ports.

FIG. 11 is a similar view showing a modified port arrangement.

FIG. 16 is a fragmentary cross-sectional view of another modified embodiment of the power piston construction.

Figure 12:
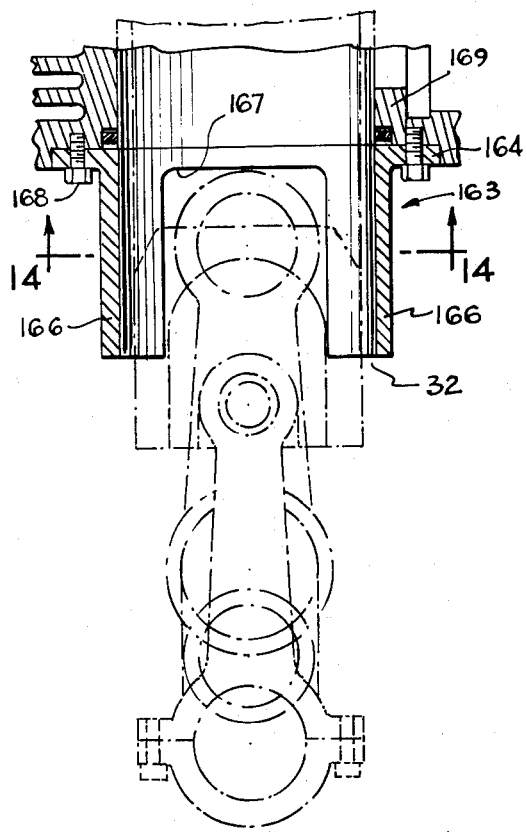
FIG. 12 is a fragmentary vertical cross-sectional view of a modified embodiment.

Referring to the drawings, the numeral 15 indicates generally a crank case on which is suitably bolted a cylinder 16. A crank shaft 17 is suitably journaled in bearings provided in the walls of the crank case 15. The crank shaft 17 includes arms, 19, 19 and 21, 21 carrying pins 22, 22 and 23, the crank pins 22 being disposed 180° from the pin 23 relative to the rotational axis of the crank shaft. A hollow power piston 24 is arranged to reciprocate within the bore of cylinder 16, said piston having diametrically opposed external wrist pins 26 cast with bosses 25 as integral parts of the piston 24. Within the piston 24 is disposed a charging piston 27 which is capable of longitudinal reciprocatory movement therein. The piston 27 carries a wrist pin 28 and a pair of connecting rods 29 connect the pins 23 and 28. It will be understood that as an alternate construction a single connecting rod having a weight equal to that of two connecting rods 29 may be used. A pair of similar connecting rods 31 connect the wrist pins 26 to the pins 22 of the crank shaft. The connecting rods 29 and 31 may be identical and may be used interchangeably.

The piston 24, illustrated in greater detail in FIGS. 6 and 7, preferably is formed of aluminum and includes a head portion having an embossment 32 formed substantially as illustrated, said embossment including opposed wing portions 33 extending to the periphery of the piston. It will be noted that the wings 33 are of the same height as the embossment 32 and together with the embossment afford a substantially continuous vertical wall across the width of the piston in relation to the intake side of the cylinder. The opposite side of the embossment 32 slopes gradually downwardly to the head of the piston.

The piston 24 is cast with a relief portion 34 in the circumferential areas between the wrist pins 26. This relief portion serves as an oil groove and also facilitates machining of the piston, since the relief area and thus, the pins 26 and bosses 25 may be avoided when machining the piston 24. The lower edge of the skirt portion of piston 24 is provided with a pair of recesses 36 to afford clearance for the arms 21 of the crank shaft. A pair of ports 37 is provided in the wall of the piston 24 immediately below the piston ring grooves 38.

The charging piston 27 preferably is formed of cast iron in order to balance the weight of the larger aluminum power piston 24 and to provide dissimilar metals for relative sliding engagement.

The cylinder 16 is provided with two inlet ports 39 (FIGS. 2 and 3). Each of the ports, as will be seen clearly in FIG. 2, includes an enlarged tapering portion 41 extending downwardly and terminating short of the bottom of the cylinder. It will be understood that the ports 37 of the piston 24 under certain conditions of operation, as will be hereinafter explained, will move into registration and communication with the ports 39 and extensions 41. Diametrically opposite the ports 39, the cylinder 16 is provided with exhaust ports 42.

The crank case 15 is provided with a circular opening 43 at its top to accommodate the piston 24 and, as will be seen by the reference to FIGS. 4 and 5, the marginal edge of the opening 43 is recessed to provide an annular groove 44 in which is received an oil ring 46 which encircles the piston 24. The oil ring 46 preferably is formed of glass or carbon filled Teflon and is provided with one or more garter springs 47 so that the ring 46 seals against the piston 24. The ring 46, however, is capable of limited axial movement within the groove. Referring particularly to FIG. 5 it will be seen that the groove 44 is provided at diametrically opposed points with passages 48 communicating with drain openings 49. Each of the openings is disposed above a respective wrist pin 26. As oil is wiped from the piston 24 it is carried into the groove 44 and then drips through the opening 49 and falls onto the external wrist pins 26 to lubricate the same. A suitable gasket 50 is provided to effect a seal between the crank case 15 and cylinder 16.

Integral with the walls of the crank case 15 and in depending relation to the marginal edges of the circular opening 43 is a pair of diametrically opposed bearing shoes 45, 45. Said shoes are coaxially alined with the bore of cylinder 16 and extend downwardly into the crank case a sufficient distance to fully engage the power piston 24 to the full limit of its downward travel as indicated in FIG. 2. The bearing shoes 45 serve to guide the piston 24 in its travel and the provision of such guide means in the crank case minimizes the requirement for guiding the piston in the cylinder bore. Also the feature of the bearing shoes permits the use of an aluminum cylinder and I have found that if the bearing surfaces of the shoes are chrome plated similar plating of the piston or cylinder bore may be avoided.

Referring to FIG. 3 a pair of reed valves 51, 51 of generally conventional construction is carried on a plate member 52 which is interposed in the conduit 53 of the carburetor, the latter being of conventional construction and not illustrated. Each of the reed valves 51 is arranged in registration with a respective port 39 and automatically opens inwardly to permit the passage of fuel mixture from the carburetor.

In the present invention the fuel mixture does not pass through the crank case as in the popular manner of operating a two cycle engine, but instead passes directly into the piston and cylinder chambers, as will be hereafter described. The oil contained within the crank case 15 is sealed from entering the bore of cylinder 16 by the oil ring 46.

The engine may be provided with a conventional fan blade 50 mounted on the crank shaft 17 and operating within a housing 54 for cooling the engine cylinder. A conventional muffler 56 communicates with the discharge ports 42 of the cylinder.

In operation, as the power piston 24 moves upwardly and the charging piston 27 moves downwardly, the piston ports 37 during an interval of upward movement are brought into registration with the inlet ports 39 and the lower extensions 41 thereof. During such interval, an air fuel mixture is caused to be drawn from the carburetor through the reed valves 51 and through the ports 39 and piston ports 37 into the interior of piston 24. It will be understood that concurrently the power piston 24 in moving upwardly is compressing a charge of fuel mixture which previously had entered into the combustion chamber above the power piston 24. Substantially at or near the end of the compression stroke of the power piston 24 the fuel mixture in the compression chamber is ignited by the spark plug 57 with the resulting explosion driving the piston 24 downwardly to turn the crank shaft 17. In such movement the exhaust ports 42 in the cylinder 16 are uncovered and correspondingly the charging piston 27 moves upwardly compressing the fuel mixture in the chamber between the pistons 24 and 27 forcing the compressed mixture through the ports 37 and 39 when the same are in registration, into the combustion chamber above the power piston 24. The pre-compressed fuel mixture entering into the combustion chamber forces the burned gases outwardly through the exhaust ports 42 while at the same time charging the combustion chamber with a fresh charge of fuel mixture. In the couse of its upward movement corresponding to its compression stroke the power piston 24 effects closure of the exhaust ports 42 and inlet ports 39 and the charge within the combustion chamber is compressed to a point where it is ignited resulting in the power piston 24 being caused to be moved downwardly to perform a work or power stroke. It will be understood the cycle as above described is repeated during the continuous operation of the engine.

In the modified embodiment illustrated in FIG. 8 the piston 24a is provided with diametrically opposed hollow bosses 25a, each of which receives a bushing 25c. The connecting rod 31a is carried on a headed pin 26a which is received in the bushing 25c.

In the modified embodiment illustrated in FIG. 9, the piston 24b is provided with diametrically opposed hollow bosses 25b in each of which is received a stepped pin 26b. The pin carries a bushing 58 which is received within the bore of connecting rod 31b.

In the modified embodiment illustrated in FIG. 16, the piston 24c is provided with a pair of diametrically opposed integral brackets 25d at the skirt portion, each affording a laterally spaced arm which is bored to support the outer end of the wrist pin 26c to which is connected the connecting rod 31c.

In each of the modified embodiments just described, the pistons 24a, 24b and 24c are provided with relief portions corresponding to relief portion 34 of the first described embodiment.

The embodiment illustrated in FIG. 11 affords an arrangement for super charging the fuel mixture prior to entry into the combustion chamber. Referring to FIG. 11, the cylinder 116 is provided with two intake ports 139 and 140 which communicate with a plenum chamber 158 in which are disposed two reed valves 150 and 151, arranged preferably as illustrated, with both valves opening inwardly. The plenum chamber 158 has an intake port 159 which connects with the discharge conduit 161 of a carburetor. The other components of the engine are substantially identical with those of the first described embodiment.

In operation, assuming that the power piston 124 is moving upwardly in its compression stroke and the charging piston 127 is moving downwardly, a charge of fuel mixture is caused to be drawn from the carburetor through the lower reed valve 150 and through the ports 140 and 137, when the same are in registration, into the chamber of piston 124. Subsequently, when the piston port 137 is in registration with the upper intake port 139 of the cylinder as illustrated in FIG. 11 an additional charge of fuel mixture is drawn from the carburetor through both reed valves 150 and 151 and through the registering ports 137 and 139 into the chamber of piston 124. When the piston 124 reaches the limit of its compression stroke, the compressed mixture within the combustion chamber is fired and as the piston 124 moves downwardly the charging piston 127 moves upwardly.

As the power piston 124 travels downwardly to the point where the ports 137 and 140 are in communication with each other, the charge within the chamber of piston 124 is being compressed by the upward movement of the charging piston 127 and this charge is caused to pass through the registering ports 137 and 140 through the plenum chamber 158 downstream of the reed valve 150 through the upper reed valve 151, through the cylinder port 139 and into the combustion chamber, the power piston 124 at this point occupying the position illustrated by the broken lines in FIG. 11 wherein the inlet port 139 of the cylinder is uncovered. It will be noted that the exhaust port 142 is still covered when the inlet port 139 is first uncovered by the power piston 124 and the reed valve 151 prevents back flow of burned gases until the exhaust port 142 is uncovered allowing the burned gases to exhaust until the pressure drops below that of the compressed fuel-air mixture, which then flows through reed valve 151 causing the burned gases in the combustion chamber to be driven out by the incoming charge. As the power positon 124 rises the exhaust port 142 is closed first while the inlet port 139 remains open allowing the compressed mixture to raise the combustion chamber pressure above atmospheric pressure for supercharging.

Figure 13:
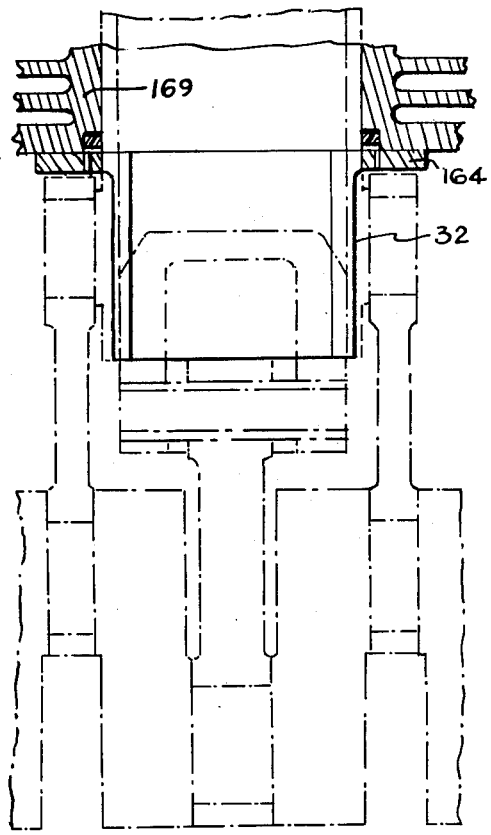
FIG. 13 is a similar view taken on a plane 90° from that illustrated in FIG. 12.
Figure 14:
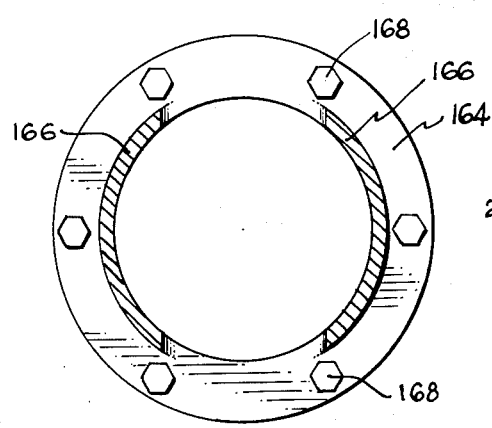
FIG. 14 is a cross-sectional view taken on line 14—14 of FIG. 12.
Figure 15:
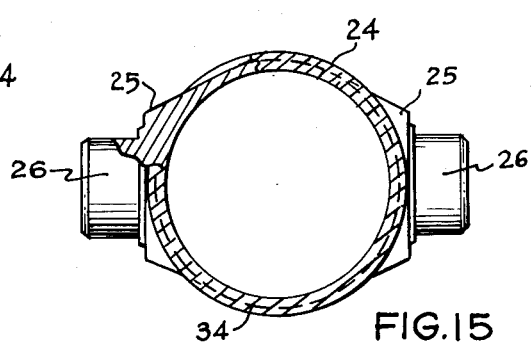
FIG. 15 is a transverse cross-sectional view of the power piston.

In the modified embodiment illustrated in FIGS. 12–14 the bearing shoes are not formed integrally with the crank case, as in the embodiment illustrated in FIGS. 1, 2 and 4, but rather are part of a separable component which may be suitably bolted to the cylinder in depending coaxial relation thereto. As will be apparent by reference to FIGS. 12–14 the component indicated generally by the numeral 163 comprises an annular flange 164 from which depend a pair of bearing shoes 166 oppositely arranged, there being spaces 167 between the shoes to afford clearances for the wrist pins of the power piston 24. The flange 164 is provided with a series of spaced apertures to receive bolts 168 which engage in threaded openings in the cylinder 169 and secure the component in depending relation.

The use of a separable bearing shoe component as above described permits casting of the crank case and cylinder as a unit and the use of dissimilar materials for producing of the cylinder and the bearing shoes. Further the use of a separable component affords greater facility in assembly of the engine parts.

Various changes coming within the spirit of my invention may suggest themselves to those skilled in the art; hence, I do not wish to be limited to the specific embodiments shown and described or uses mentioned, but intend the same to be merely exemplary, the scope of my invention being limited only by the appended claims.

I claim:
1. In a gasoline engine the combination comprising,
 (a) an engine cylinder,
 (b) a crank case associated with said cylinder,
 (c) a first piston reciprocably disposed within said cylinder and including a skirt portion,
 (d) a crank shaft rotatably mounted within said crank case,
 (e) a pair of coaxially aligned external wrist pins carried on said skirt portion,
 (f) a first connecting rod connecting each of said wrist pins with said crank shaft,
 (g) said first piston having a bore therein,
 (h) a second piston disposed within said bore and reciprocable therewithin,
 (i) a second connecting rod connecting said second piston with said crank shaft,
 (j) said pistons being relatively reciprocable in opposite directions,
 (k) a stationary oil ring disposed at the juncture of said cylinder and crank case and in wiping engagement with said first piston,
 (l) and drainage apertures communicating with said oil ring and being disposed each above and substantially in vertical registration with a respective external wrist pin whereby oil wiped from the first piston by said oil ring will drop on said wrist pins to lubricate the same.

2. In a gasoline engine, the combination comprising,
 (a) an engine cylinder,
 (b) a crank case associated with said cylinder,
 (c) the crank case having a bore in registration with the bore of said engine cylinder,
 (d) a first piston reciprocably disposed within said cylinder and including a skirt portion,
 (e) a crank shaft rotatably mounted within said crank case,
 (f) a pair of coaxially aligned external wrist pins formed rigidly with said skirt portion at diametrically opposed points thereon,
 (g) a first connecting rod connecting each of said wrist pins with said crank shaft,
 (h) said first piston having a bore therein,
 (i) a second piston disposed within said bore and reciprocable therewithin,
 (j) a second connecting rod connecting said second piston with said crank shaft,
 (k) said pistons being reciprocable in opposite directions,
 (l) said crank case having an annular groove concentric with the crank case bore and disposed at the juncture of said cylinder and said crank case,
 (m) an oil ring seated in said groove and in wiping engagement with said first piston,
 (n) said groove having a pair of drainage apertures, each being disposed above and in vertical registration with a respective wrist pin whereby oil wiped from said piston by said ring will drop on said wrist pin to lubricate the same.

3. In a gasoline engine, the combination comprising,
 (a) an engine cylinder,
 (b) a crank case associated with said cylinder,
 (c) the crank case having a bearing in axial registration with the bore of said engine cylinder,
 (d) a piston reciprocably disposed within said cylinder and including a skirt portion,
 (e) a crank shaft rotatably mounted in said crank case,
 (f) a pair of coaxially aligned external wrist pins, disposed diametrically at opposed points on said skirt portion,
 (g) a connecting rod connecting each of said wrist pins with said crank shaft,
 (h) said crank case having an annular groove concentric with the crank case bearing and disposed at the juncture of said cylinder and said bearing,
 (i) and an oil ring seated in said groove and in wiping engagement with said piston,
 (j) the bearing being separable from said cylinder so as to permit ready installation of said oil ring in said groove.

4. In a gasoline engine, the combination comprising,
 (a) an engine cylinder,
 (b) a crank case associated with the cylinder,
 (c) a first piston reciprocably disposed within said cylinder and including a skirt portion,
 (d) a crank shaft rotatably mounted in said crank case,
 (e) a pair of coaxially aligned wrist pins formed rigidly with said skirt portions at diametrically opposed points thereon,
 (f) a first connecting rod connecting each of said wrist pins with said crank shaft,
 (g) said first piston having a bore therein,
 (h) a second piston reciprocable within said bore,
 (i) a second connecting rod connecting said second piston with said crank shaft,
 (j) said pistons being relatively reciprocable in opposite directions, (k) said first connecting rods being substantially equal in weight to said second connecting rod, (l) the pistons being formed of dissimilar metals with the first piston being formed of relatively lighter weight metal than the metal from which the second piston is formed so that both have substantially the same weight and are substantially balanced.

References Cited by the Examiner

UNITED STATES PATENTS

| | | | |
|---|---|---|---|
| 905,389 | 12/08 | Towle | 123—50 |
| 1,114,034 | 10/14 | Prescott | 123—50 |
| 1,126,332 | 1/15 | Abbott | 123—66 |
| 1,164,454 | 12/15 | LeBihan | 123—193 |
| 1,178,691 | 4/16 | Tarkington | 123—66 |
| 1,211,008 | 1/17 | Thie et al. | 123—50 |
| 1,215,483 | 2/17 | Charles | 123—50 |
| 1,257,598 | 2/18 | Golata et al. | 123—50 |
| 1,338,056 | 4/20 | Wahl | 123—66 |
| 1,418,351 | 6/22 | Atwood | 123—193 |
| 1,436,130 | 11/22 | Webb | 123—193 |
| 1,508,260 | 9/24 | Sutton | 123—66 |
| 1,533,926 | 4/25 | Larson | 123—66 |
| 1,637,765 | 8/27 | Comstock | 184—18 |
| 1,732,011 | 10/29 | Gouirand | 123—66 |
| 1,774,251 | 8/30 | Boissiere | 123—66 |
| 1,798,313 | 3/31 | Dauenhauer | 123—66 |
| 1,910,902 | 5/33 | McKone. | |
| 2,117,292 | 5/38 | Brott | 123—50 |
| 2,418,901 | 4/47 | Read. | |
| 2,514,016 | 7/50 | Casodo. | |
| 2,547,957 | 4/51 | Meadows | 184—18 X |
| 2,714,875 | 8/55 | Carroll. | |
| 2,845,918 | 8/58 | Goodzeit | 308—237 X |
| 3,059,418 | 10/62 | Johnson | 74—44 X |

BROUGHTON G. DURHAM, *Primary Examiner*.